(12) United States Patent
Hill et al.

(10) Patent No.: US 9,370,740 B2
(45) Date of Patent: Jun. 21, 2016

(54) MODULAR STACKING FILTER SYSTEM

(71) Applicants: Jeffrey Hill, Cicero, NY (US); John J. Fitzsimmons, Clay, NY (US); Robert M. Witter, Englewood, FL (US)

(72) Inventors: Jeffrey Hill, Cicero, NY (US); John J. Fitzsimmons, Clay, NY (US); Robert M. Witter, Englewood, FL (US)

(73) Assignee: ONEIDA AIR SYSTEMS, INC., Syracuse, NY (US)

( * ) Notice: Subject to any disclaimer, the term of this patent is extended or adjusted under 35 U.S.C. 154(b) by 0 days.

(21) Appl. No.: 14/168,591

(22) Filed: Jan. 30, 2014

(65) Prior Publication Data

US 2014/0208704 A1 Jul. 31, 2014

Related U.S. Application Data

(60) Provisional application No. 61/758,942, filed on Jan. 31, 2013.

(51) Int. Cl.
*B01D 46/00* (2006.01)
*B01D 46/24* (2006.01)
*B01D 46/52* (2006.01)

(52) U.S. Cl.
CPC ........ *B01D 46/0021* (2013.01); *B01D 46/0013* (2013.01); *B01D 46/0019* (2013.01); *B01D 46/2411* (2013.01); *B01D 46/2414* (2013.01); *B01D 46/521* (2013.01)

(58) Field of Classification Search
CPC ............ B01D 46/0013; B01D 46/002; B01D 46/0021; B01D 46/2411; B01D 46/2414; F16L 17/06; F16L 19/0206; F16L 23/02; F16L 23/036
See application file for complete search history.

(56) References Cited

U.S. PATENT DOCUMENTS

| | | | | |
|---|---|---|---|---|
| 5,261,934 A * | 11/1993 | Shutic et al. | ..................... | 95/280 |
| 5,290,330 A * | 3/1994 | Tepper et al. | ..................... | 96/381 |
| 5,306,332 A * | 4/1994 | Allen | ............................. | 95/273 |
| 2004/0103626 A1* | 6/2004 | Warth et al. | ..................... | 55/467 |
| 2009/0241492 A1* | 10/2009 | Lin | ............................. | 55/418 |
| 2011/0203238 A1* | 8/2011 | Witter et al. | ..................... | 55/356 |
| 2013/0014479 A1* | 1/2013 | Mann et al. | ..................... | 55/493 |

* cited by examiner

*Primary Examiner* — Robert Clemente
(74) *Attorney, Agent, or Firm* — Bernhard P Molldrem, Jr.

(57) ABSTRACT

A stacking modular filter arrangement may be employed as a final filter for the dust collector for woodshop or other environment in which dust in an air stream is separated out and the exhausted air is filtered in the final filter to return to the ambient. The filter arrangement employs at least first and second filter modules of similar section, and a number of clamp members to hold facing end plates of the filter modules and pull the end plates against one another with one or more gasket members compressed between them. This arrangement permits the available filter area of the final filter to be customized to the customer's needs.

9 Claims, 4 Drawing Sheets

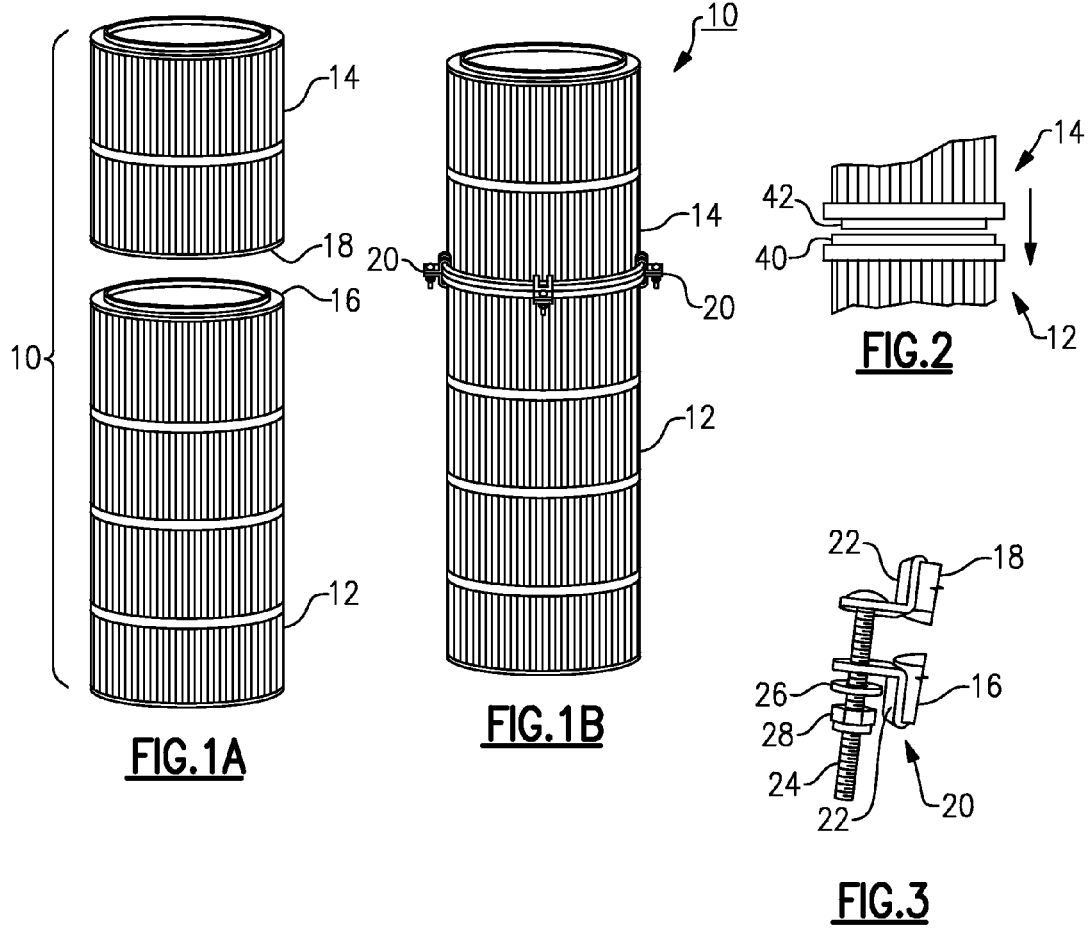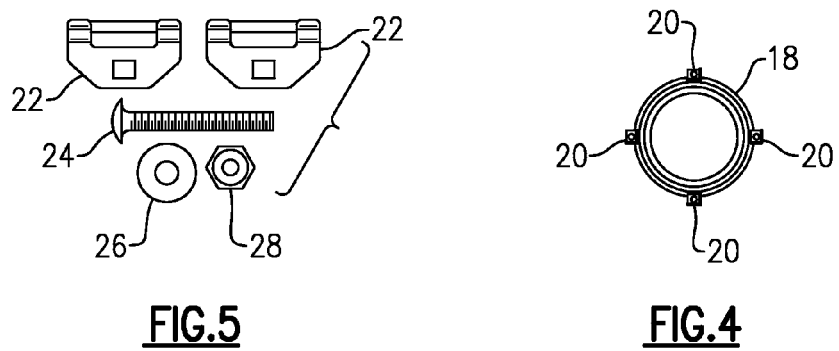

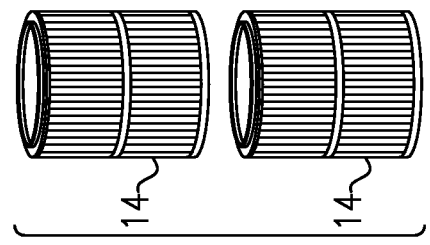
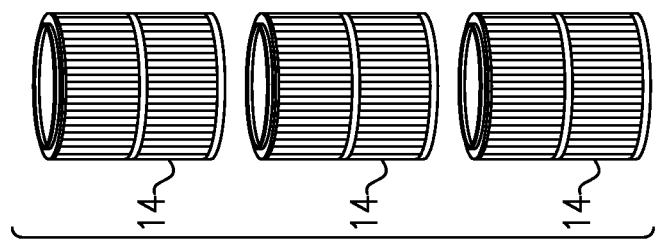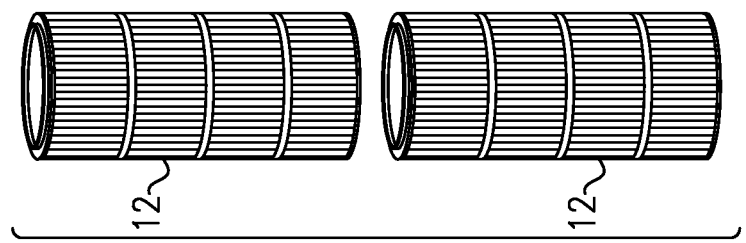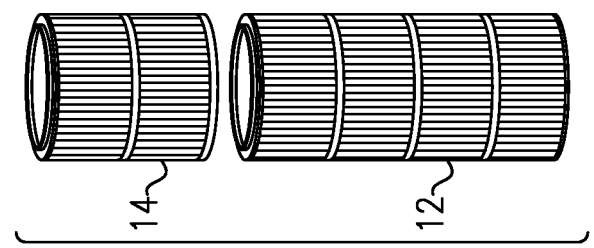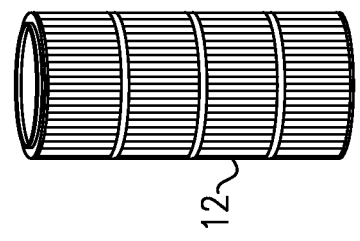

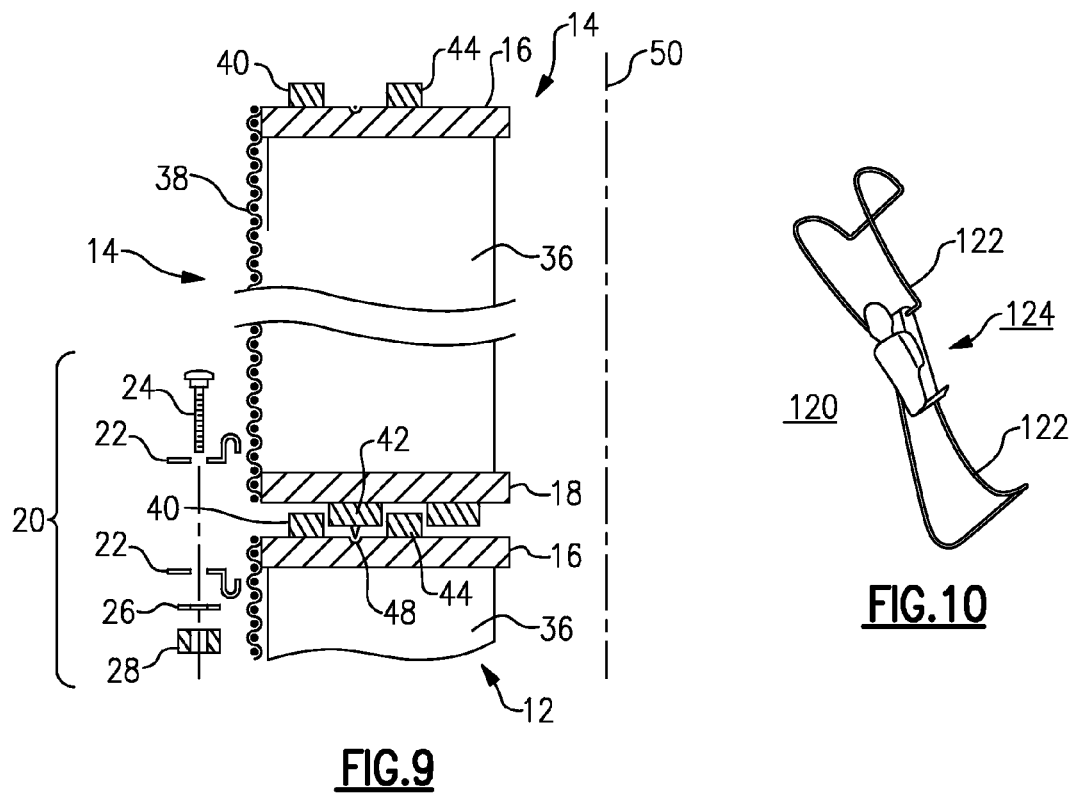
FIG. 9
FIG. 10
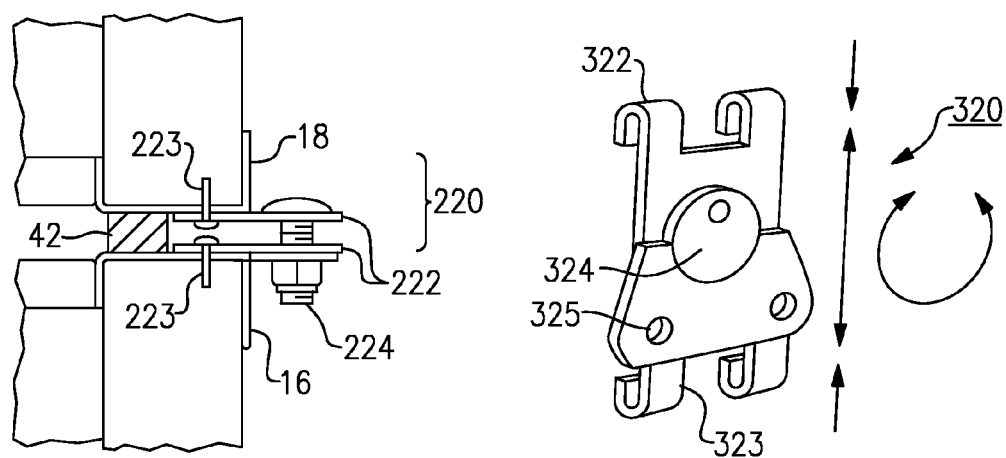
FIG. 11
FIG. 12

MODULAR STACKING FILTER SYSTEM

Applicant(s) claim priority under 35 U.S.C. §119(e) of their provisional patent application, U.S. Ser. No. 61/758,942, filed Jan. 31, 2013. The disclosure thereof is incorporated herein by reference.

BACKGROUND OF THE INVENTION

This invention is directed to a filter system such as a cartridge filter system that can be used, for example, with a dust collector as used in cabinetmaking, carpentry and similar trades, in which a process dust is directed from dust producing equipment to a dust storage drum and in which the air that is separated from the dust is returned through a HEPA or similar final air filter to the ambient.

The needs of the customer for a given filter may vary, and in some cases, a filter with a larger filter area is needed. However, larger filters are more expensive to produce and to ship, and can be difficult to install. There is a need for a simple way to customize the filter size to the customer's needs, and to reduce the cost of shipping and reduce the difficulty in installing very large filters.

The solution we propose is a modular stacking filter system, of the type disclosed and shown in the attached drawings Figures. The filters of similar cross section are stacked one atop another and held together using stacking clamps. A number of sets of these clamps are distributed around the end flanges of the mating two filters. These clamps can, for example, comprise hook members that fit over the rims of the cartridge filter caps.

Favorably, there is a larger diameter seal or gasket on one end of the filter and a smaller diameter seal or gasket on the other end, so that the facing ends of the two stacked filter cartridges will have interfitting gaskets of staggered diameters. The two adjacent filters may be assembled with the smaller diameter gasket end at the base of the upper filter and the larger diameter gasket end at the top of the lower filter, so one gasket fits inside the other. Then the filters are clamped together using these clamps. In one embodiment, each clamp comprises a pair of stacking clips, plus a carriage bolt, washer and Nyloc nut. The nuts of these are tightened gradually around the filter to keep the gaskets compressed evenly. The only tool needed is a common hex head wrench. In other embodiments, spring clamps or double-hooked draw latch clamps may be used.

A large variety of filter combinations are possible, depending upon the filter area needed for a given application. The filter cartridges can be stacked one atop the other to achieve a filter assembly having the desired filter area.

In the illustrated embodiment described below, each of the clips comprises two hooked legs that fit over (or under) the circumferential flange of the cylindrical cartridge filter. A cutout or pocket formed between the two legs allows for curvature of the cap of the cartridge filter on which the clip is attached. The two legs are bent up from a horizontal flange with a square recess to receive the head of a carriage bolt. The clamp easily assembled from the two clips plus a carriage bolt, a washer and a retaining nut, as disclosed generally.

The cartridge filters as employed in this illustrated embodiment are 18 inches in diameter, and either a nominal 19 or 19.5 inches in length or a nominal 39 inches in length. The stacking system can be used with filters of other dimensions, smaller or larger diameter than what is shown here. These need not be cylindrical, but may be of square, rectangular or oval section. There can be other lengths of the filters as well, and the stacked filters can be formed with three, four, or more individual filter components. Also, other styles of clamps or clips may be employed to join the stacking filter components, e.g., variable tension draw latch clamps.

The modular stacking filter arrangement can be employed in a dust collection system in which dust in an air stream is passed through a final filter back into the ambient air. The improvement of this invention permits final filter to be formed of a stack of filter components of similar cross section, at least a first and a second filter module, and each with an end cap defining an opening into a core of the filter module and an outer rim. Typically there is at least one gasket supported on at least one such end cap, and favorably interfitting gaskets on the two end caps. In the stack, the first and second filter modules have their end caps facing one another with the gasket(s) compressed between them. A plurality of clamp assemblies distributed at regular intervals about the circumference of the stacked filter modules have portions that hook over the end caps or are otherwise attached to the end caps, and each including a member to draw the facing end caps towards one another compressing the gasket(s) between them. In a favorable embodiment, these clamp assemblies can be formed of a simple and inexpensive arrangement of two hook-flange clips each of which has a square aperture in a flange portion. Carriage bolts fit through the square apertures of the two clips, and are held in place using a washer and nut. Only a single wrench is required for assembly.

Various alternative clamp arrangements, e.g., a draw clamp or a turn-cam clamp, may be used instead.

Many possible variations of this inventive feature are possible that would follow the same basic principles. The filter can be of another configuration, e.g., rectangular or oval in section. This feature can be used on either a cyclonic or on a non-cyclonic dust collector system.

BRIEF DESCRIPTION OF THE DRAWING

FIG. 1A and FIG. 1B show an assembly of two stacking modular cartridge filters, before and after being joined together, respectively, in accordance with one possible embodiment of this invention.

FIG. 2 is a partial schematic elevation showing interfitting gaskets of two stacked filter modules.

FIG. 3 is a perspective view of a clamp arrangement on an illustrative embodiment.

FIG. 4 is a vertical section illustrating circumferential distribution of the clamp arrangements of this embodiment.

FIG. 5 shows the individual components of the clamp arrangement of this embodiment.

FIGS. 6A to 6E are perspective assembly views of various possible combinations of modular stacked filter assemblies according to embodiments of this invention.

FIG. 9 is a sectional view of a portion of the stacked filter arrangement, illustrating interfitting gaskets of staggered diameters.

FIG. 10 is a perspective view of an alternative clamp mechanism in this case a lever draw clamp.

FIG. 11 is a sectional view of a further embodiment of a clamp, here employing flat-plate flange members.

FIG. 12 is a perspective view of a still further embodiment of a clamp, here a turn-cam draw clamp.

DETAILED DESCRIPTION OF THE PREFERRED EMBODIMENT(S)

Figure 7:
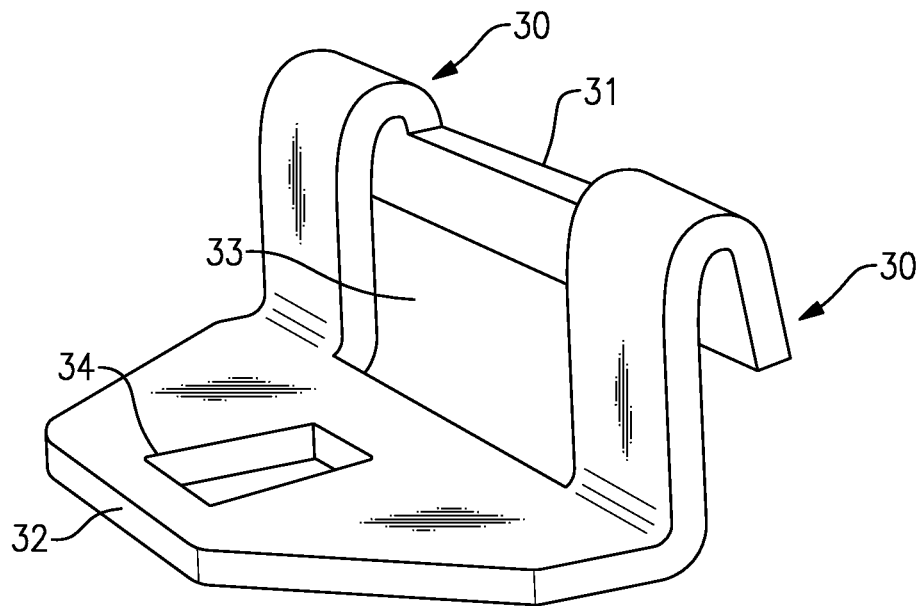
FIG. 7 is an enlarged view of one of the pairs of flanged clips of the clamping arrangements of the described embodiment.

With reference to the Drawing, and initially for FIGS. 1A and 1B, a stacked modular filter assembly 10 is comprised of a first filter module 12 (here a cylindrical HEPA module) with a diameter of eighteen inches and a nominal height of thirty nine inches, and a second filter module with a diameter of eighteen inches and a height of nineteen and one-half inchs. These filter modules have pleated media with an effective filter area of about 110 square feet and 45 square feet, or a total of 155 square feet. The two modules are stacked so that the end cap 16 of the lower filter module 12 faces against the lower end cap 18 of the other filter module 14. These two modules are joined together by means of four clamp arrangements 20, as shown in FIG. 1B. Favorably each end cap 16 and 18 has a circular gasket 40 and 42, respectively, as shown in FIG. 2, with the gasket 42 having a smaller diameter so that the two gaskets 40 and 42 nest together, one within the radius of the other, and do not rest on one another.

In a preferred arrangement, the clamp arrangements 20 are each constructed as shown in FIG. 3, with a pair of flanged clips 22, each having a hook portion fitting over the annular wall of the respective end cap 16, 18, and each with a projecting flange. A carriage bolt 24 or equivalent hardware pulls the two flanges towards each other to secure the filter modules to one another.

Four clamp arrangements 20 are situated at ninety-degree intervals around the circumference of the two filter end caps 16, 18, as illustrated in FIG. 4. The hardware involved in each clamp assembly is shown in FIG. 5, with a pair of hook and flange clips 22, carriage bolt 24, washer 26 and Nylok locking nut 28. A number of the various combinations of filters that can be assembled to achieve a given filter area as shown in FIGS. 6A to 6E. A single module 12, of eighteen inches by thirty-nine inches (diameter and height), as shown in FIG. 6A, would be selected to achieve a filter area of 110 square feet. A module 14 of eighteen by nineteen and one-half inches is added to the first module 12 to gain an addition 45 square feet of filter area, as shown in FIG. 6B, for a total of 155 square feet. A pair of the long modules 12, 12 may be joined together, as shown in FIG. 6C, to achieve a total filter area of 220 square feet. Three stacked smaller filter modules 14, 14, 14 can be selected as shown in FIG. 6D to achieve a filter area of 135 square feet. Two of the smaller modules 14, 14 can be stacked together, as shown in FIG. 6E, to achieve a filter area of 90 square feet. Many other combinations of filter modules of various lengths can be used, depending upon the filtration needs and the specific customer application.

Figure 8:
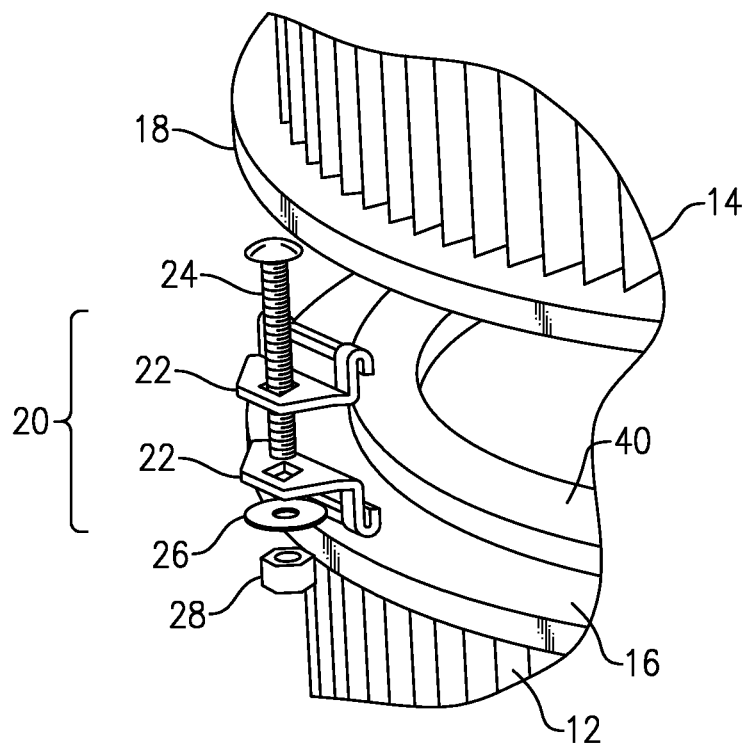
FIG. 8 is an assembly view illustrating construction of the clamping arrangement of this embodiment.

Detail of the hook and plate clip 22 mentioned above is shown in more detail in FIG. 7. Each of the two clips is of identical construction. The clip 22 has a pair of hook members 30, 30 each formed at a bend from left and right ends of a transverse flange member 32. The hook members have crooks that are joined by a crossbar 31, and with a gap or pocket 33 between the two hook members on the flange side. The open gap or pocket allows for the curvature of the cylindrical wall of the end cap 16 or 18 on which the clip 22 is fitted. The flange has an opening 34 for the receiving the bolt 24, and in this embodiment the opening 34 is square to accommodate the square shoulder portion of the carriage bolt 24. The clamp arrangement 20 is assembled as illustrated in the assembly view of FIG. 8, with the upper clip 22 fitting over the cylindrical wall of the cap 18 of the upper filter module 14, the lower clip 22 fitting over the cylindrical wall of the cap 16 of the lower filter module 12, and the carriage bolt passing through the square openings 34, and being secured with the washer 26 and nut 28. The four clamp assemblies are installed with the nuts 28 turned in loosely, and then the nuts of these are tightened gradually, going around the filters, so that the gaskets 40, 42 compress evenly.

Details of one possible interfitting gasket arrangement for the filters 12 and 14 is illustrated in the sectional view of FIG. 9. Here half of the filter only is shown, with the axis 50 (through the open filter core) being represented as a dash-dot broken line. The upper filter module 14 is shown atop the lower filter module 12, here with a pair of radially spaced annular gasket members 40 and 44 on the end cap 16 of the lower filter module, and with an annular gasket member 42 positioned on the end cap 18 radially between the positions of the gasket members 40 and 44. The clamp assembly 20, i.e., the two clips 22, carriage bolt 24, washer 26 and nut 28, pull the end caps 16, 18 together and compress the gasket members. These gasket members 40, 42, and 44 nest within the radius of one another, and interfit to form a seal and block any air from escaping between the filters. If desired, an annular channel 48 can be present in the upper end cap 16 of the filter module 12 to hold a fluid gasket material, if a fluid gasket system is desired. In this illustration, the upper filter module also has an end cap 16 with annular gaskets 40 and 44 similar to those described above, and which will interfit gasket members on a third filter module, if present, or with gasket members on an end cap (not shown) if an additional filter module is not present.

Alternative clamp mechanisms could be employed in place of the clips 22 and carriage bolts 24 of the clamp assemblies 20 as described above.

A draw clamp or over-the-center clamp arrangement 120 is shown in FIG. 10, which can have a pair of bail-type hook members 122, 122 connected to a hinged clamping member 124. Here, the hook members 122, 122 may be made of a rather stiff spring wire, so that there is a spring force applied onto the upper and lower end caps 18, 16 of the two conjoined filter modules. Another simple alterative clamp arrangement 220 is shown in FIG. 11, in which flat plates or flanges 222, 222 are each affixed onto the end caps 18, 16 of the filter modules, here with simple sheet metal screws 223. These are pulled together using a carriage bolt 224, with associated washer and nut, similar to what is described in respect to the first embodiment. Here a single gasket 42 is shown compressed between the two end caps 16, 18, but this clamp technique could be used with other gasket configurations.

A twist-cam clamp arrangement 320 is shown in FIG. 12. Here there are two hook members 322 and 323 that are joined so as to slide up and down with respect to one another, with a cam wheel 324 or other eccentric member that pulls the hook members 322 and 323 towards one another when a handle 325 is twisted to rotate the cam wheel 324. As seen here, the hook members each have a gap or pocket to accommodate curvature of the respective filter module end cap.

Preferably, the filter modules can be HEPA or high-efficiency particulate air filters, with pleated media, but of course the stacked modular filter system can be employed with other types of filters where customization of the filter arrangement is required to match the customer needs. The gaskets can be closed-cell synthetic rubber, and may have a minimum thickness of about one inch and width of one inch. In some cases, a fluid seal, e.g. with a silicone, may be employed to occupy a fluid-filled channel between filter modules.

While the modular stacking filter module system has been illustrated here with respect to selected embodiments, it should be understood that the arrangement of this invention is not limited only to such embodiments, and that many other embodiments would become apparent to persons skilled in the art without departing from the scope and spirit of the invention, as defined in the appended claims.

We claim:

1. In a dust collection system in which dust in an air stream is passed through a final filter back into the ambient air, the improvement in which the final filter is formed of a stack of filter components of similar cross section, said stack including first and second cylindrical filter modules, each of the same diameter and each with an end cap at each end thereof defining an opening into a core of the filter and an outer rim, and with at least one gasket supported on at least one such end cap, such that the first and second filter modules have one of the end caps of one filter facing one of the end caps of the other filter, with said at least one gasket compressed therebetween; and further including a plurality of clamp assemblies each being removably fitted onto the facing end caps of the first and second filter modules, and each of said clamp assemblies including a hook member at each end thereof to fit onto an associated rim of one of said facing end caps, and hardware connecting the two hook members adapted to draw the facing end caps towards one another with said gasket compressed therebetween.

2. The dust collection system of claim 1, in which the clamp members are distributed evenly about the circumference of the first and second filter modules that are being clamped together.

3. The dust collection system of claim 2, wherein said plurality of clamp members includes four clamp members situated at ninety-degree intervals about the circumference of said first and second filter modules.

4. The dust collection system of claim 1, wherein said first and second filter modules include cylindrical filter cartridges of substantially eighteen inches diameter and having a height of nineteen to thirty-nine inches.

5. The dust collection system of claim 1, wherein each of the facing end caps of said first and second filter modules bears a respective annular gasket, said gaskets having different radii such that the gaskets interfit one within the other between the facing end caps.

6. The dust collection system of claim 1, wherein said stack of filter modules includes three or more filter modules, each of the same diameter.

7. In a dust collection system in which dust in an air stream is passed through a final filter back into the ambient air, the improvement in which the final filter is formed of a stack of filter components of similar cross section, said stack including first and second filter modules each with an end cap defining an opening into a core of the filter and an outer rim, and with at least one gasket supported on at least one such end cap, such that the first and second filter modules have the end caps facing one another with said at least one gasket compressed therebetween; and further including a plurality of clamp assemblies attached to the end caps of the first and second filter modules, and each including a member to draw the facing end caps towards one another with said gasket compressed therebetween; wherein each clamp is formed of a pair of flanged clips, each of said clips having a hook end adapted to attach onto an outer rim of the end cap of a respective one of said first and second filter modules, and a flange extending outward therefrom and having a square aperture therein, and including a carriage bolt passing through the square apertures of the pair of flanged clips.

8. The dust collection system of claim 7, wherein each said hook end is formed of a pair of crooks with a gap therebetween to accommodate outward curvature of the outer rim of said end cap.

9. In a dust collection system in which dust in an air stream is passed through a final filter back into the ambient air, the improvement in which the final filter is formed of a stack of filter components of similar cross section, said stack including first and second filter modules each with an end cap at each end thereof defining openings into a core of the filter and an outer rim, and with at least one gasket supported on at least each of said end caps, such that the first and second filter modules have associated end caps facing one another with said at least one gasket compressed therebetween; and further including a plurality of clamp assemblies removably attached to the end caps of the first and second filter modules, and each including a member to draw the facing end caps towards one another with said gasket compressed therebetween; and wherein the gaskets at each of the facing end caps of said first and second filter modules have respective different radii such that the gaskets interfit one within the other between the facing end caps, with the gasket at one end cap of the filter having a larger radius than the gasket at the other end cap thereof.

* * * * *